United States Patent

Kameyama

[11] Patent Number: 6,115,063
[45] Date of Patent: *Sep. 5, 2000

[54] COLOR SPECTRUM DETECTING CIRCUIT AND IMAGE SENSING APPARATUS

[75] Inventor: Takashi Kameyama, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,660

[22] Filed: Apr. 11, 1997

[30] Foreign Application Priority Data

Apr. 11, 1996 [JP] Japan ................................ 8-089822
Mar. 4, 1997 [JP] Japan ................................ 9-049309

[51] Int. Cl.[7] ............................. H04N 5/228; H04N 9/73
[52] U.S. Cl. ........................................ 348/222; 348/655
[58] Field of Search .................... 348/222, 223, 348/224, 225, 228, 262, 265, 655, 645, 649, 652, 662; 358/518, 519, 520

[56] References Cited

U.S. PATENT DOCUMENTS

| | | |
|---|---|---|
| 4,219,841 | 8/1980 | Nishimura et al. ................ 348/228 |
| 4,506,293 | 3/1985 | Hurst, Jr. . |
| 5,031,049 | 7/1991 | Toyama et al. . |
| 5,274,440 | 12/1993 | Miyazaki ............................ 348/655 |
| 5,307,158 | 4/1994 | Tsuruta et al. ..................... 348/265 |
| 5,568,193 | 10/1996 | Kawahara .......................... 348/222 |
| 5,640,205 | 6/1997 | Munakata et al. ................. 348/222 |
| 5,644,359 | 7/1997 | Ito ...................................... 348/223 |

FOREIGN PATENT DOCUMENTS

| | | |
|---|---|---|
| 0 552 016 A2 | 7/1993 | European Pat. Off. . |
| 0 620 692 A1 | 10/1994 | European Pat. Off. . |
| 3-272294 | 3/1991 | Japan . |
| 3-266586 | 11/1991 | Japan . |
| 6-141337 | 5/1994 | Japan . |

*Primary Examiner*—Tuan Ho
*Assistant Examiner*—Luong Nguyen
*Attorney, Agent, or Firm*—Frommer Lawrence & Haug, LLP.; William S. Frommer

[57] ABSTRACT

A color spectrum detecting apparatus is provided which can correctly detect whether an input signal is within a selected color spectrum from color information that are insensitive to luminance.

10 Claims, 5 Drawing Sheets

(PRIOR ART)

COLOR SPECTRUM DETECTING CIRCUIT AND IMAGE SENSING APPARATUS

BACKGROUND OF THE INVENTION

The present invention relates to a color spectrum detecting circuit and an image sensing apparatus using the same. Particularly, the color spectrum detection circuit determines whether an input signal is in the range of a color spectrum set in accordance with the color information unaffected (insensitive to) by luminance.

"Contours" is used in the broadcast television camera system art to denote the signal that represents the changes between adjacent picture elements, both vertically and horizontally. A contour correcting circuit emphasizes image sharpness and compensates for response degradation of an image sensing device used in video cameras. For example, in a facial shot, a video camera incorporating such contour correcting circuit would suppress the degree of contour emphasis to prevent every wrinkle and pore on the person's face from being accentuated to highlight the person's aesthetic qualities or to improve the person's aesthetic qualities (i.e., modifying the person's skin tone or flesh tone). This process of suppressing the degree of contour emphasis is referred to as skin tone detail processing.

The skin tone detail processing is explained in conjunction with FIG. 6. Weights are attached to each color difference signals R-Y and B-Y before they are added together to determine hues $\phi U$ and $\phi L$. The result of this addition is supplied to a comparative circuit which compares it to a reference voltage. The comparative circuit generates a gate signal indicative of whether a desired color spectrum AR has been obtained, for example the hatched region in FIG. 6 may represent a skin tone region of the image. Since, the color spectrum detection utilizes luminance sensitive color difference signals R-Y and B-Y, any change in the luminance signal Y, such as a change in the lighting condition or aperture, will alter the signal level of the color difference signals R-Y and B-Y and may lead to incorrect detection of the skin tone region.

OBJECTS OF THE INVENTION

Therefore, it is an object of the present invention to provide an apparatus for detecting the color spectrum which overcomes the shortcomings of the above-discussed apparatus.

Another object of the present invention is to provide an image sensing apparatus which incorporates the aforesaid apparatus.

Various other objects, advantages and features of the present invention will become readily apparent from the ensuing detailed description, and the novel features will be particularly pointed out in the appended claims.

SUMMARY OF THE INVENTION

In accordance with this invention, the color spectrum detecting apparatus correctly detects whether an input signal is within a selected color spectrum, i.e., skin tone spectrum. The color spectrum is selected in accordance with first and second color information which are insensitive to (unaffected by) luminance Y. For example, luminance Y may fluctuate due to a change in lighting condition or aperture of the image sensing apparatus.

In accordance with an aspect of this invention, the first color information is determined as a function of a luminance signal W and a red signal R component of the input signal and the second color information is determined as a function of the luminance signal W and a blue signal B component of the input signal.

In accordance with another aspect of this invention, the allowable range of the color spectrum is defined by a box in the first and second color information plane. The input signal is detected to be within the color spectrum if the input signal is within the box defined by a first reference color of the first color information, a second reference color of the second color information, a first detection threshold and a second detection threshold.

In a preferred embodiment, the color spectrum apparatus is incorporated into an image sensing apparatus to perform a desired color correction on a particular color spectrum without being affected by luminance Y. Preferably, the image sensing apparatus corrects the color of the detected (sensed) image, e.g., a facial image, when the color spectrum apparatus detects the input signal to be within range of the selected color spectrum.

BRIEF DESCRIPTION OF THE DRAWINGS

The following detailed description, given by way of example, and not intended to limit the present invention solely thereto, will best be understood in conjunction with the accompanying drawings in which.

DESCRIPTION OF THE PREFERRED EMBODIMENTS

As previously discussed, the color spectrum detecting apparatus must be capable of correctly detecting the skin tone region. Hereinafter preferred embodiments of the present invention are described in detail with reference to the accompanying drawings.

Figure 1:
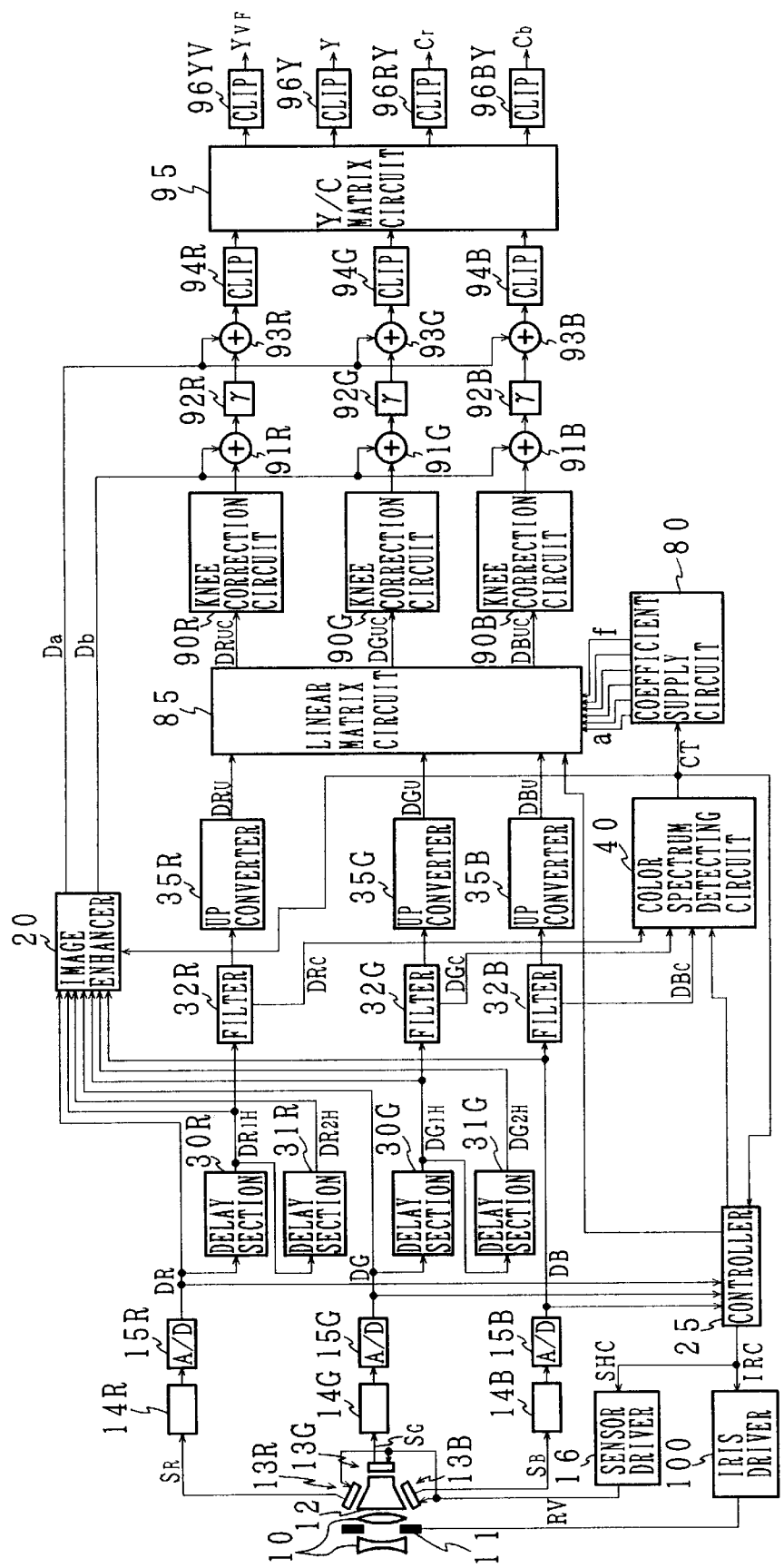
FIG. 1 is a block diagram illustrating an embodiment of an image sensing apparatus of the present invention.

Turning now to FIG. 1, there is illustrated a block diagram of an image sensing apparatus comprising an image enhancer 20, a controller 25, a color spectrum detecting circuit 40, a coefficient supply circuit 80, a linear matrix circuit 85, knee correction circuits 90R, 90G, 90B, and a Y/C matrix circuit.

An incident ray of light is supplied to a color separating prism 12 via lenses 10 and an iris 11. As the incident ray passes through the separating prism 12, the incident ray separates into a red ray, a green ray, and a blue ray. Image sensing devices 13R, 13G and 13B (hereinafter referred to as CCD image sensors) respectively detect three primary signals from the red, green and blue rays of light and respectively output three color sensing signals $S_R$, $S_G$ and $S_B$.

The lenses 10 focus the incident ray of light to form an optical image of an object on image sensing surfaces of the CCD image sensors 13R, 13G and 13B. The iris 11 controls the amount (quantity) of light transmitted to the CCD image sensors 13R, 13G and 13B.

The color sensing signals $SR_I$, $S_G$ and $S_B$ generated by the CCD image sensors 13R, 13G and 13B are supplied to the analog process circuits 14R, 14G and 14B, respectively. The analog process circuits 14R, 14G, and 14B perform defect correction and level control such as white balance and black balance. Preferably, the analog process circuits perform non-linear conversion on the color sensing signal $S_R$, $S_G$ and $S_B$. The level controlled color sensing signals are respectively supplied to A/D converters 15R, 15G and 15B.

Although not shown, the A/D converter 15R, 15G, and 15B digitize the level controlled color sensing signals by a first sampling signal $f_s$, for example, 18 MHz, (not shown) and a clock signal CK1 (FIG. 3A) to generate three primary (red, green and blue) image sensing signals DR, DG and DB, respectively. These three primary image sensing signals DR, DG and DE are supplied to the image enhancer 20 and the controller 25.

The red image sensing signal DR is also supplied to a delay section 30R which delays the red image sensing signal DR by one horizontal scan interval. The once delayed red image sensing signal $DR_{1H}$, is supplied to the image enhancer 20, a filter 32R and a delay section 31R. The delay section 31R delays the once delayed red image sensing signal $DR_{1H}$ by another horizontal scan interval. The twice delayed red image sensing signal $DR_{2H}$ is supplied to the image enhancer 20.

Similarly, the green image sensing signal DG is also supplied to a delay section 30G which delays the green image sensing signal DG by one horizontal scan interval. The once delayed green image sensing signal $DG_{1H}$ is supplied to the image enhancer 20, a filter 32G and a delay section 31G. The delay section 31G delays the once delayed green image sensing signal $DG_{1H}$ by another horizontal scan interval. The twice delayed green image sensing signal $DG_{2H}$ is supplied to the image enhancer 20.

The blue image sensing signal DB is also supplied to a filter 32B. The blue image sensing signal DR corresponds to the image position of the once delayed red image sensing signal $DR_{1H}$ and the once delayed green image sensing signal $DG_{1H}$.

The image enhancer 20 generates detail signals $D_a$ and $D_b$ for emphasizing the image contours from the red image sensing signal DR, the once delayed red image sensing signal $DR_{1H}$, the twice delayed red image sensing signal $DR_{2H}$, the green image sensing signal, the once delayed green image sensing signal $DG_{1H}$, the twice delayed green image sensing signal $DG_{2H}$ and the blue image sensing signal DB. Also, the image enhancer 20 receives a color spectrum detect signal CT from the color spectrum detecting circuit 40 (described hereinbelow in conjunction with FIG. 2) and controls the signal levels of the detail signals $D_a$ and $D_b$ in response to the color spectrum detect signal CT.

Figure 3:
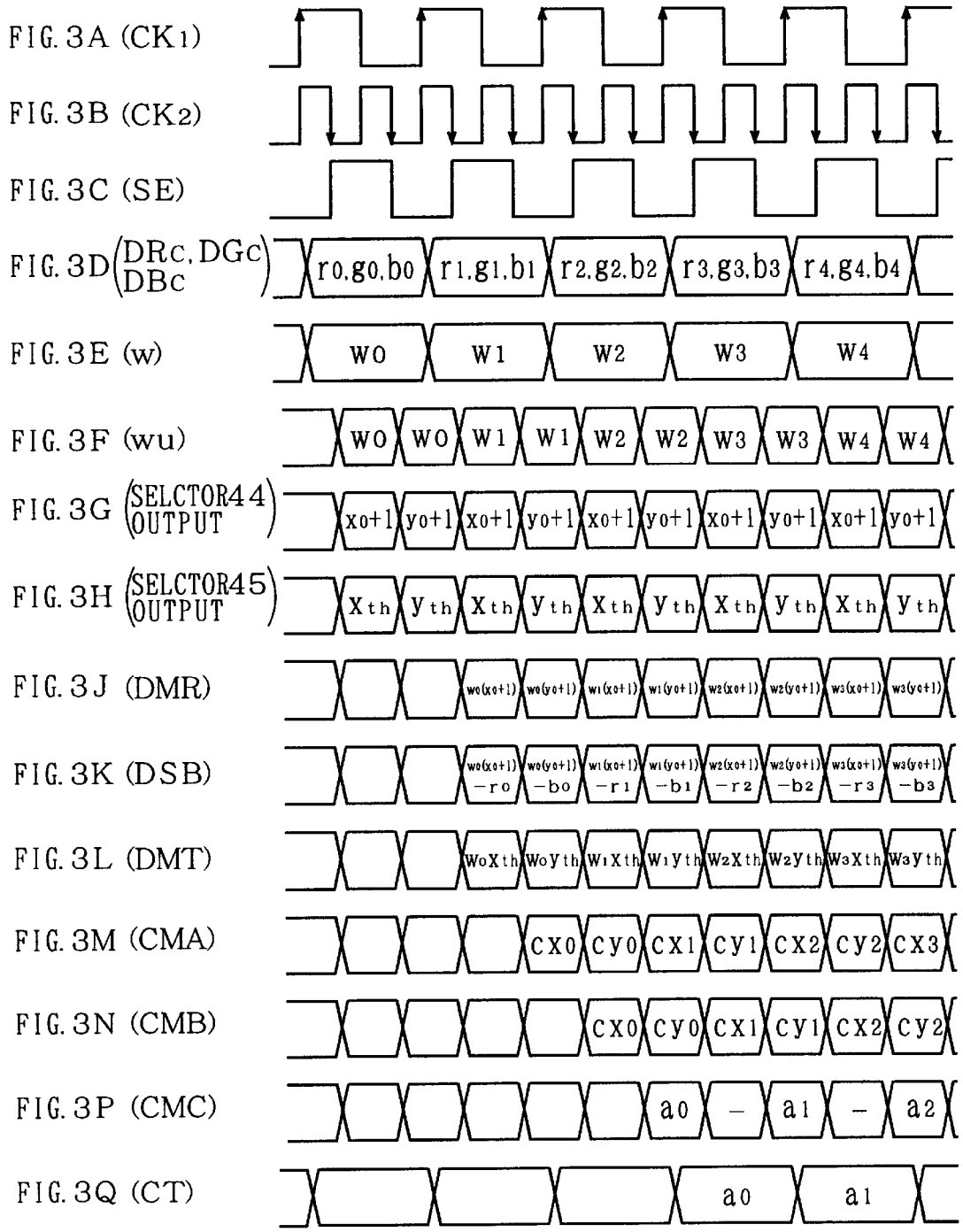
FIGS. 3A–3Q are timing diagrams to which reference will be made in describing the operation of the color spectrum detecting circuit 40.

The filters 32R and 32B comprise a delay element (not shown) and a low pass filter. The once delayed red image sensing signal $DR_{1H}$, and the blue image sensing signal DB are supplied to both the delay element and the low pass filter. The delay element delays the once delayed red image sensing signal $DR_{1H}$ and the blue image sensing signal DB for a predetermined time before supplying these signals to up converters 35R and 35B, respectively. Although not shown, in response to a clock signal CK2 (FIG. 3B), the up converters 35R and 35B respectively convert (up-convert) the once delayed red image sensing signal $DR_{1H}$ and the blue image sensing signal DB further delayed by the delay element. As shown in FIGS. 3A and 3B, the clock signal CK2 has a frequency sufficiently higher than the clock signal CK1. The up converters 35R and 35B supply an up-converted red image sensing signal $DR_U$ and an up-converted blue image sensing signal $DB_U$, respectively, to the linear matrix circuit 85.

The low pass filter limits the once delayed red image sensing signal $DR_{1H}$ and the blue image sensing signal DB and supplies a filtered (band limited) red image sensing signal $DR_C$ and a filtered (band limited) blue image sensing signal $DB_C$ to the color spectrum detecting circuit 40. In other words, low frequency components of the once delayed red image sensing signal $DR_{1H}$ and the blue image sensing signal DB are supplied to the color spectrum detecting circuit 40.

The filter 32G comprises a delay element (not shown) and an interpolating filter. The once delayed green image sensing signal $DG_{1H}$ is supplied to both the delay element and the interpolating filter. The delay element delays the once delayed green image sensing signal DGLH for a predetermined time before supplying this signal to an up converter 35G. Although not shown, in response to the clock signal CK2 (FIG. 3B), the up converter 35G converts (up-converts) the once delayed green image sensing signal $DG_{1H}$ further delayed by the delay element. The up converter 35G supplies an up-converted green image sensing signal $DG_U$ to the linear matrix circuit 85.

The interpolating filter matches the phase of the once delayed green image sensing signal $DG_{1H}$ with the filtered red image sensing signal $DR_C$ and the filtered blue image sensing signal $DB_C$ and supplies a filtered (in phase) green image sensing signal $DG_C$ to the color spectrum detecting circuit 40.

The color spectrum detecting circuit 40 determines whether input signals are within a particular color spectrum (range) from the three filtered primary image sensing signals $DR_C$, $DG_C$, and $DB_C$. If the input signals are (R, G, B), then luminance signal W (the signal before non-linear level conversion such as γ correction to correct the tone characteristic) is calculated as follows:

$$W = 0.30R + 0.59G + 0.11B, \quad (1)$$

where R is a red signal, G is a green signal and B is a blue signal. Equations (2) and (3) respectively define first color information x (or simply color x) and second color information y (or simply color y), and colors (x, y) defines a position on the first and second color information plane for an input signal on the graph depicted in FIG. 5.

$$x = (R - W)/W \quad (2)$$

$$y = (B - W)/W. \quad (3)$$

The controller 25 specifies a reference color $x_0$ representing the first color information and a reference color $y_0$ representing the second color information. These reference colors $(x_0, y_0)$ are used to detect whether the input signals are within a particular color spectrum. The controller 25 also specifies a detection threshold value $x_{th}$ indicating a spectrum range of the first color information and a detection threshold value $y_{th}$ indicating a spectrum range of the second color information. If the first color information x and the second color information y of the input signals satisfy following conditions:

$$|x_0-x| \leq x_{th} \quad (4)$$

$$|y_0-y| \leq y_{th}, \quad (5)$$

then the input signals are determined (detected) to be within the range of the selected color spectrum. It will be appreciated that the reference colors are not limited to $(x_0, y_0)$ and different reference colors can be also used. It will be also appreciated that the detection threshold values $x_{th}$ and $y_{th}$ can be varied to optimize the color spectrum detection. In other words, the dotted box in FIG. 5 defines the allowable range of the selected color spectrum in the first and second color information plane and the box can be enlarged or reduced to optimize the color spectrum detection in accordance with a user's preference.

Substituting the values of x and y as respectively defined in equations (2) and (3) into equations (4) and (5) lead to the following:

$$|Wx_0-(R-W)| \leq Wx_{th} \quad (6)$$

$$|Wy_0-(B-W)| \leq Wy_{th}. \quad (7)$$

Equations (6) and (7) simplify the spectrum detection processing by eliminating the dividing operation, i.e., (R−W)/W and (B−W)/W. Further rearranging the terms of equations (6) and (7) leads to the following equations which are simpler to use:

$$|W(x_0+1)-R| \leq Wx_{th} \quad (8)$$

$$|W(y_0+1)-B| \leq Wy_{th}. \quad (9)$$

Figure 5:
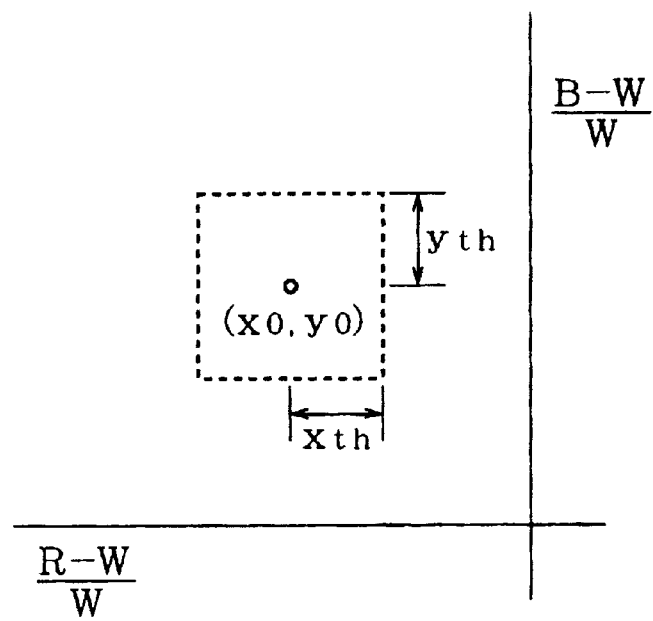
FIG. 5 is a graph on the first and second color information plane for a video signal.
Figure 6:
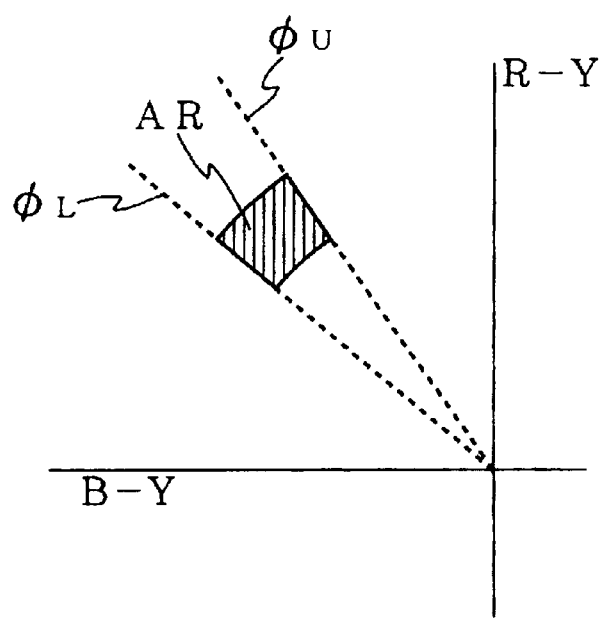
FIG. 6 is a diagram to which reference will be made in describing the skin tone detail processing.

Equations (8) and (9) can be further simplified if the reference colors $x_0$, $y_0$, $(x_0+1)$ and $(y_0+1)$ are positive values as shown in FIG. 5:

$$x_0+1=R_0/W_0 \quad (10)$$

$$y_0+1=B_0/W_0. \quad (11)$$

Due to the similarity of equations (8) and (9), the color spectrum detection processing may constitute a single small scale circuit performing the above-noted arithmetic operations in a time division manner, where a first set of input comprising $(x_0+1, x_{th}, R)$ for equation (8) can be multiplexed with a second set of input comprising $(y_0+1, y_{th}, B)$ for equation (9).

Returning to FIG. 1, the controller 25, the spectrum setting means, includes an integrating circuit (not shown) for integrating the three primary image sensing signals DR, DG, and DB of a specified color spectrum to calculate integral values $R_S$, $G_S$ and $B_S$. From these three integral values $R_S$, $G_S$ and $B_S$, a luminance integral value $W_S$ is calculated as follows:

$$W_S=0.30R_S+0.59G_S+0.11B_S. \quad (12)$$

The reference colors $(x_0+1)$ and $(y_0+1)$ are derived from the luminance integral value $W_S$ and the integral values $R_S$ and $G_S$ in the following manner:

$$x_0+1=R_S/W_S \quad (13)$$

$$y_0+1=B_S/W_S \quad (14)$$

The controller 25 supplies the calculated reference colors $(x_0+1)$ and $(y_0+1)$ to the color spectrum detecting circuit 40. The spectrum setting means sets a reference color $x_0$ of the first color information, a reference color $y_0$ of the second color information, a detection threshold value $x_{th}$ indicating a spectrum range of the first color information, and a detection threshold value $y_{th}$ indicating a spectrum range of the second color information Turning now to FIG. 2, there is illustrated a block diagram of the color spectrum detecting circuit 40 of FIG. 1. As illustrated, the color spectrum detecting circuit 40 is comprised of a W matrix section 41, selectors 44, 45 and 55, a select signal generator 46, an absolute value calculating section 61, and a comparator 65.

A signal generator (not shown) generates the clock signal CK1 (FIG. 3A) and the clock signal CK2 (FIG. 3B) having a frequency twice the frequency of the clock signal CK1. The clock signals CK1 and CK2 are supplied to a select signal generator 46 which generates a selector control signal SE (FIG. 3C) in response to these two clock signals. The selector control signal SE is supplied to the selectors 44, 45 and 55, and a register 67.

The three filtered primary image sensing signals $DR_C$, $DG_C$ and $DB_C$ with their phases matched are supplied to the W matrix section 41. The filtered red image sensing signal $DR_C$ and the filtered blue image sensing signal $DB_C$ are also supplied to the selector 55.

The W matrix section 41 calculates the luminance signal W in accordance with equation (1) and supplies the luminance signal W to a clipping section 42 for clipping the luminance signal W, such as limiting the amplitude of the luminance signal to a predetermined level. Although not shown, the clipped luminance signal $W_U$ is stored in a register 43 in response to the clock signal CK2 (FIG. 3B). In response to the clock signal CK2, the register 43 supplies the luminance signal $W_U$ to multipliers 47 and 48. Although not shown, registers 50–53 and 56–58 and 66 are also driven by the clock signal CK2 (FIG. 3B) and registers 69 and 70 are driven by clock signal CK1 (FIG. 3A).

The controller 25 (FIG. 1) supplies the reference colors $(x_0+1)$ and $(y_0+1)$ to the selector 44 and the detection threshold values $x_{th}$ and $y_{th}$ to the selector 45. In response to the selector control signal SE (FIG. 3C), the selectors 44 and 45 select either the reference color $(x_0+1)$ and the detection threshold value $x_{th}$, respectively, or the reference color $(y_0+1)$ and the detection threshold value $y_{th}$. The selector 44 supplies the selected reference color to the multiplier 47 and the selector 45 supplies the selected detection threshold value to the multiplier 48.

The multiplier 47 multiplies the selected reference color, either $(x_0+1)$ or $(y_0+1)$, with the luminance signal $W_U$ received from the register 43. Although not shown, a multiplication data signal DMR indicating the result of the multiplication is stored in registers 50 and 51 in response to the clock signal CK2 (FIG. 3B). In response to the clock signal CK2, the register 51 supplies the multiplication data signal DMR to a subtractor 60. It is appreciated that when a new multiplication data signal DMR is supplied to the register 50, the content of the register 50, i.e., the previous multiplication data signal DMR stored in the register 50, is moved to the register 51. In other words, if the content of the register 50 is $W_U(x_0+1)$, then the content of register 51 is $W_U(y_0+1)$.

The multiplier 48 multiplies the selected detection threshold value, $x_{th}$ or $y_{th}$, with the luminance signal $W_U$ received from the register 43. Although not shown, a multiplication data signal DMT indicating the result of the multiplication is stored in registers 52 and 53 in response to the clock signal CK2 (FIG. 3B). In response to the clock signal CK2, the register 53 supplies the multiplication data signal DMT to the comparator 65. It is appreciated that when a new multiplication data signal DMT is supplied to the register 52, the content of the register 52, i.e., the previous multiplication data signal DMT stored in the register 52, is moved to the register 53. In other words, if the content of the register 52 is $W_U x_{th}$, then the content of register 53 is $W_U y_{th}$.

In response to the selector control signal SE, the selector 55 either selects the filtered red image sensing signal $DR_C$ or the filtered blue image sensing signal $DB_C$. Since the selectors 44, 45 and 55 select in response to the same selector control signal SE, the selector 55 selects the image sensing signal in conjunction with the selectors 44 and 45. The selector 55 selects the filtered red image sensing signal $DR_C$ if the reference color ($x_0$+1) and the detection threshold value $x_{th}$ have been respectively selected by the selectors 44 and 45. The selector 55 selects the filtered blue image sensing signal $DB_C$ if the reference color ($y_0$+1) and the detection threshold value $y_{th}$ have been respectively selected by the selectors 44 and 45. A selected image sensing signal DRB indicating the selected image sensing signal is stored in registers 56, 57 and 58 in response to the clock signal CK2. In response to the clock signal CK2, the register 58 supplies the selected image sensing signal DRB to the subtractor 60. It is appreciated that when a new selected image sensing signal DRB is supplied to the register 56, the content of the register 56, i.e., the previous multiplication data signal DMT stored in the register 56, is moved to the register 57 and the content of the register 57 is moved to register 58.

The subtractor 60 subtracts the selected image sensing signal DRB from the multiplication data signal DMR received from the multiplier 47 via the registers 50 and 51. A subtraction data signal DSB indicating the result of the subtraction is supplied to the absolute value calculating section 61. It will be appreciated that the subtractor 60 performs either arithmetic operation $W(x_0+1)-DR_C$ or $W(y_0+1)-DB_C$ depending on the selections of selectors 44, 45 and 55.

The absolute value calculating section 61 calculates an absolute value signal DAB in accordance with the left side of either equation (8) or (9) and supplies the absolute value signal DAB to the comparator 65.

The comparator 65 compares the absolute value signal DAB to the multiplication data signal DMT received from the register 53. It will be appreciated that the comparator 65 determines (calculates) a compare signal indicating whether the input signals satisfy equation (8) or (9). In other words, the multiplication data signal representing the result of the multiplication between the detection threshold value $x_{th}$ and the luminance signal $W_U$ is compared to the absolute value signal DAB representing the absolute value of $W(x_0+1)-DR_C$.

Although not shown, the compare signal is stored in register 66 as a compare signal CMA in response to the clock signal CK2 (FIG. 3B). In response to the clock signal CK2, the register 66 supplies the compare signal CMA to an AND gate 68 and the register 67. The register 67 stores the compare signal CMA as a compare signal CMB. In response to the selector control signal SE, the register 67 supplies the compare signal CMB to the AND gate 68. It is appreciated that when a new compare signal is supplied to the register 66, the content of register 66 is moved to the register 67. In other words, if the register 66 contains the compare signal CMA indicating whether equation (8) is satisfied, then the register 67 contains the compare signal CMB indicating whether equation (9) is satisfied.

The AND gate 68 supplies a compare signal CMC to the register 69. Although not shown, in response to the clock signal CK1, the register 69 stores the compare signal CMC and supplies the compare signal CMC to the register 70. The register 70 stores the compare signal CMC as a color spectrum detect signal CT. For example, the color spectrum detect signal CT at a high level "H" indicates that the input signal is within the selected color spectrum and low level "L" indicates that the input signal is outside the selected color spectrum. Although not shown, in response to the clock signal CK1 (FIG. 3A), the register 70 supplies the color spectrum detect signal CT to the image enhancer 20 (FIG. 1) and the coefficient supply circuit 80 (FIG. 1).

The manner in which the color spectrum detecting circuit 40 determines whether input signals are within the selected color spectrum is explained in conjunction with the timing diagrams of FIGS. 3A–3Q.

The clock signals CK1 (FIG. 3A) and CK2 (FIG. 3B) are supplied to the select signal generator 46 (FIG. 2) which generates the selector control signal SE (FIG. 3C). The select signal generator 46 inverts the signal level of the selector control signal SE in synchronization with the falling edge (hereinafter referred to as a negative edge) of the clock signal CK2.

Figure 2:
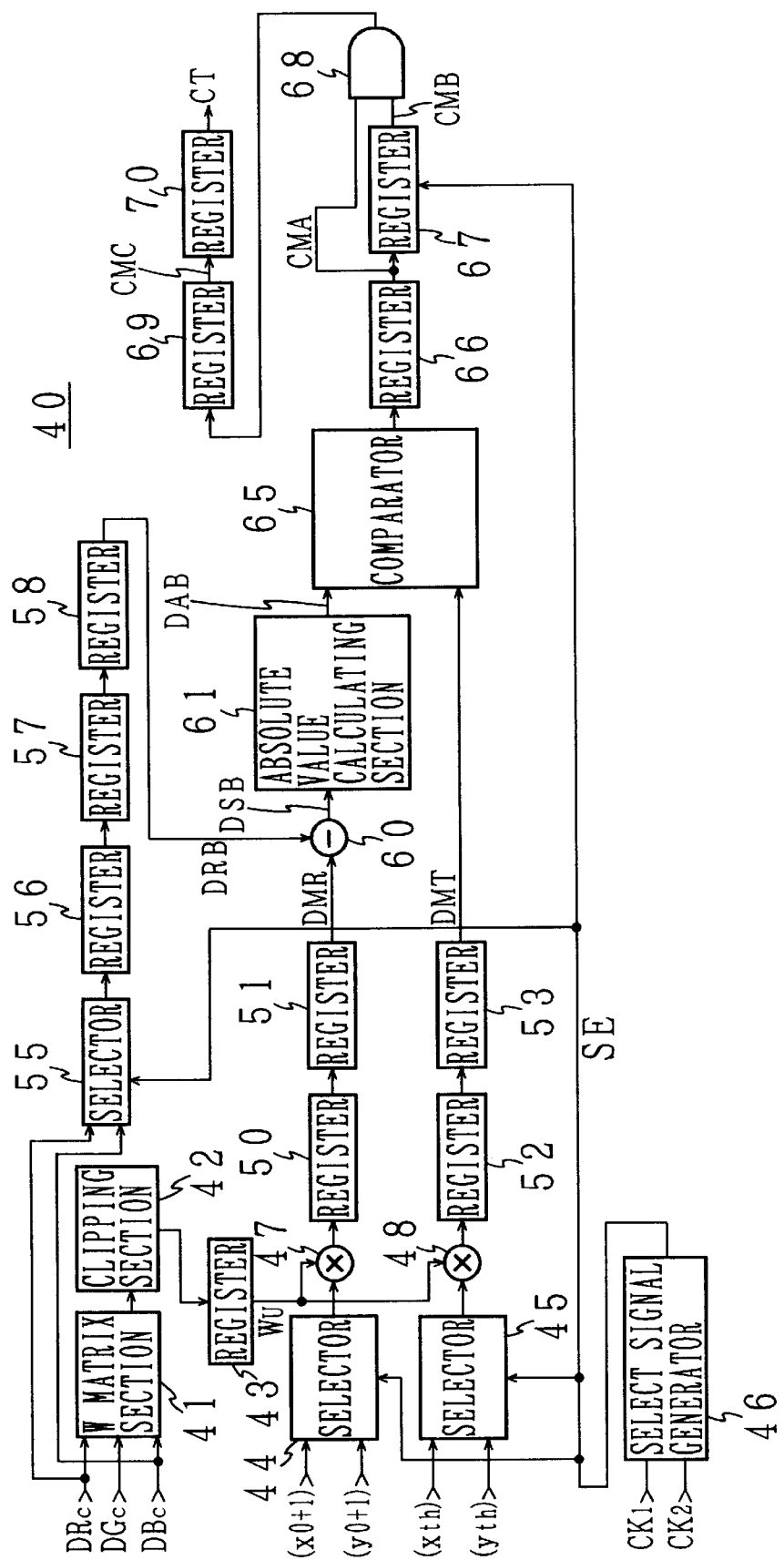
FIG. 2 is a block diagram illustrating an embodiment of the color spectrum detecting circuit 40 of the present invention.

The filters 32R, 32G and 32B (FIG. 1) respectively supply the three filtered primary image sensing signals $DR_C$, $DG_C$ and $DB_C$ (FIG. 3D) to the W matrix section 41 (FIG. 2). In response to these three filtered primary image sensing signals $DR_C$, $DG_C$ and $DB_C$, the W matrix section 41 generates the luminance signal W (FIG. 3E). For example, if the data value of the three filtered primary image sensing signals $DR_C$, $DG_C$ and $DB_C$ are "$R_0$, $G_0$, $B_0$", then the data value of the luminance signal W is "$W_0$" and if the data value of the three filtered primary image sensing signals $DR_C$, $DG_C$ and $DB_C$ are "$R_1$, $G_1$, $B_1$", then the data value of the luminance signal W is "$W_1$". The luminance signal W is supplied to the clipping section 42 which generates the clipped luminance signal $W_U$ (FIG. 3F) and temporarily stores the clipped luminance signal $W_U$ in the register 43 at the negative edge of the clock signal CK2 (FIG. 3B).

When the signal level of the selector control signal SE is at a high level "H", the selector 44 selects the reference color ($x_0$+1) (FIG. 3G) and, at the same time, the selector 45 selects the detection threshold value $x_{th}$ (FIG. 3H). Whereas, when the signal level of the selector control signal SE is at a low level "L", the selector 44 selects the reference color ($y_0$+1) and, at the same time, the selector 45 selects the detection threshold value $y_{th}$.

The multiplier 47 multiplies the selected reference color and the luminance signal $W_U$ (FIG. 3F) to generate the multiplication data signal DMR (FIG. 3J). The multiplication data signal DMR is temporarily stored in the registers 50 and 51 to effectively delay the multiplication data signal DMR to the subtractor 60 by two periods of the clock signal CK2.

The multiplier 48 multiplies the selected detection threshold value and the luminance signal $W_U$ (FIG. 3F) to generate the multiplication data signal DMT (FIG. 3L). The multiplication data signal DMT is temporarily stored in the registers 52 and 53 to effectively delay the multiplication data signal DMT to the comparator 65 by two periods of the clock signal CK2.

The selector 55 selects the filtered red image sensing signal $DR_C$ when the signal level of the selector control signal SE is at the high level "H" and the filtered blue image sensing signal $DB_C$ when the signal level of the selector control signal SE is at the low level "L". The selected image sensing signal DRB is temporarily stored in registers 56, 57 and 58 to effectively delay the selected image sensing signal DRB to the subtractor 60 by three periods of the clock signal CK2. The subtractor 60 subtracts the selected image sensing signal DRB from the multiplication data signal DMR (FIG. 3J) to generate the subtraction data signal DSB (FIG. 3K). The subtractor 60 supplies the subtraction data signal DSB to the absolute value calculating section 61 to calculate the absolute value thereof. The absolute value calculating section 61 supplies the absolute value signal DAB to the comparator 65.

The comparator 65 compares the absolute value signal DAB to the multiplication data signal DMT to generate a compare signal indicating whether the input signals satisfy either equation (8) or (9). The comparator 65 temporarily stores the compare signal in registers 66 and 67 to effectively delay the compare signal to the AND gate 68. The register 66 supplies the compare signal CMA which was effectively delayed by one period of the clock signal CK2 (FIG. 3M) to the AND gate 68 and the register 67 supplies the compare signal CMB which was effectively delayed by two periods of the clock signal CK2 (FIG. 3N) to the AND gate 68.

The AND gate 68 generates a compare signal CMC (FIG. 3P) as a function of the compare signals CMA and CMB and supplies the compare signal CMC to the register 69. Although not shown, the register 69 stores the compare signal CMC and supplies it to the register 70 in response to the clock signal CK1. Although not shown, in response the clock signal CK1, the register 70 supplies the color spectrum detect signal CT (FIG. 3Q) indicating whether the input signal is within the selected color spectrum (i.e., a skin tone area) to the image enhancer 20 (FIG. 1), the controller 25 (FIG. 1) and the coefficient supply circuit 80 (FIG. 1). The color spectrum detect signal CT has a high level "H" (i.e., a0=1 in FIG. 3Q) indicating that the input signal is within the skin tone area and a low level "L" (i.e., a0=0 in FIG. 3Q) indicating that the input signal is outside of the skin tone area.

It will be appreciated that the comparator 65 includes means to minimize the hysterisis in the compare signal due to a slight change in the signal level of either the absolute value signal DAB or the multiplication data signal. In other words, the comparator 65 prevents the compare signal from changing due to a slight change in either the absolute value signal DAB or the multiplication data signal, thereby ensuring a stable color spectrum detection by the color spectrum detecting circuit 40.

Returning to FIG. 1, the image enhancer 20 controls the signal levels of the detail signals $D_a$ and $D_b$ in accordance with the color spectrum detect signal CT. For example, if the color spectrum detect signal CT indicates the detection of a skin tone region, then the image enhancer 20 lowers (reduces) the signal levels of the detail signals $D_a$ and $D_b$ to suppress the degree of contour emphasis to prevent wrinkle, pore, rough skin and like on the person's face from being accentuated (emphasized) to highlight the person's aesthetic qualities or to improve the person's aesthetic qualities. It will appreciated that the skin tone region encompasses not only the facial portion, but the person's entire flesh or skin.

The coefficient supply circuit 80 generates coefficients (a, b, c, d, e, f) as a function of the color spectrum detect signal CT received from the color spectrum detecting circuit 40. The generated coefficients (a, b, c, d, e, f) are supplied to the linear matrix circuit 85.

The linear matrix circuit 85 performs color correction on the up-converted primary image sensing signals $DR_U$, $DB_U$ and $DG_U$ received from the up-converters 35R, 35B and 35G, respectively, in response to the coefficients (a, b, c, d, e, f). The linear matrix circuit 85 automatically switches the coefficients used in the linear matrix operation automatically. Hence, a multiple set of coefficients (a, b, c, d, e, f) may be employed where each set uniquely corresponds to a particular color spectrum. For example, a color spectrum having coefficients $a_1=0.39$, $b_1=0.15$, $c_1=0.16$, $d_1=0.22$, $e_1=0.09$ and $f_1=0.07$ may be used to adjust the colors of the skin tone, hereinafter referred to as the skin tone spectrum, and another color spectrum having coefficients $a_1=0.31$, $b_1=0.08$, $c_1=0.09$, $d_1=0.18$, $e_1=0.04$ and $f_1=0.02$ may used to adjust the colors of the background. Since a particular set of coefficients (a, b, c, d, e, f) are determined for a selected color spectrum, the present invention advantageously adjusts only the colors of that selected color spectrum, e.g., colors of the skin tone spectrum, without affecting colors of the other color spectrums. Alternatively, the linear matrix circuit automatically switches between multiple sets of coefficients (color corrections) in accordance with the selected color spectrum. As previously described, the filters 32R, 32B and 32G includes delay elements to adjust the timing of these primary image sensing signals.

Figure 4:
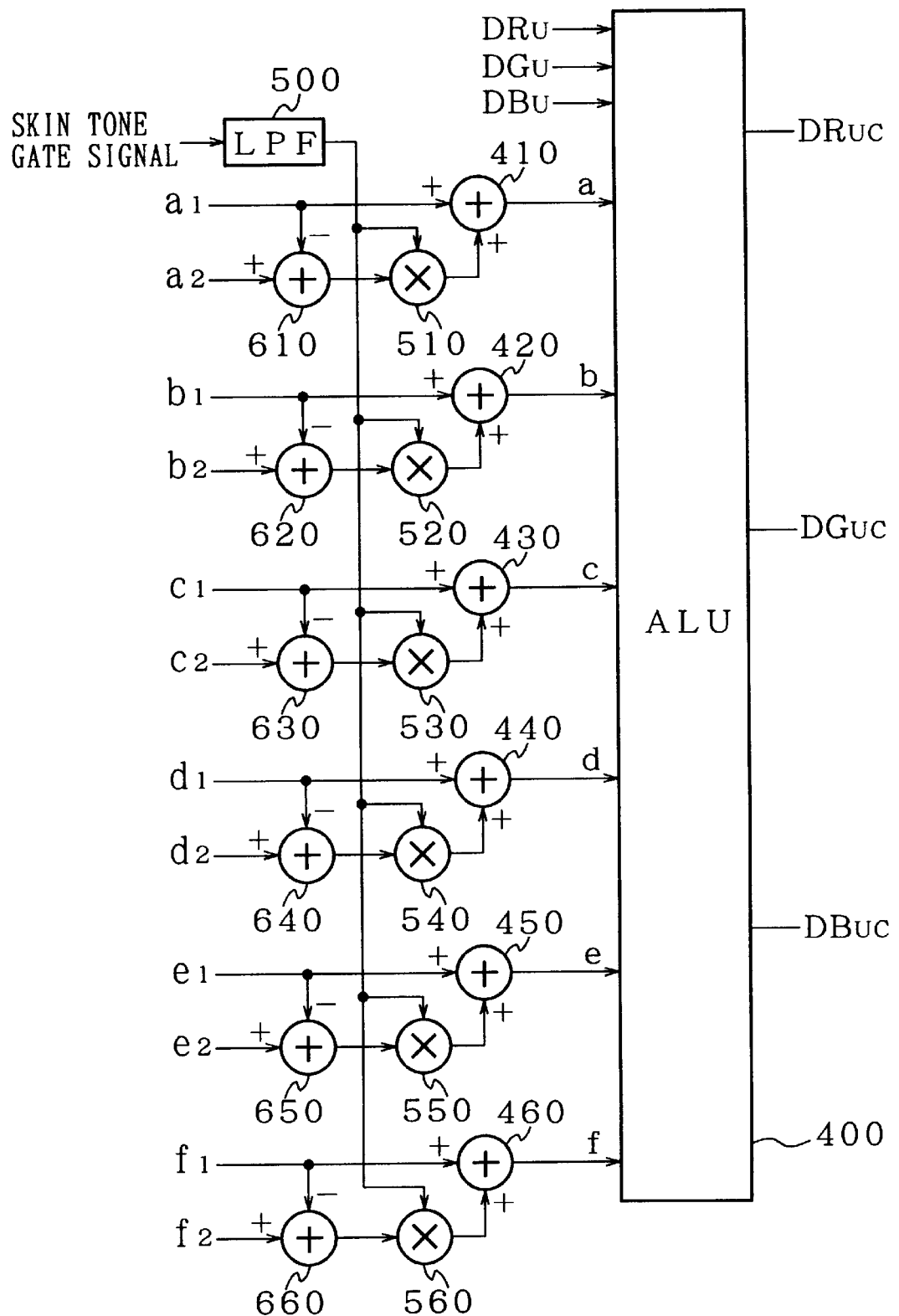
FIG. 4 is a block diagram illustrating an embodiment of the linear matrix circuit 85 of FIG. 1.

Turning now to FIG. 4, there is illustrated a block diagram of the linear matrix circuit 85 of FIG. 1 used to automatically select between coefficients of two color spectrums. As illustrated, the linear matrix circuit 85 is comprised of ALU 400, a low pass filter 500, adders 410, 420, 430, 440, 450 and 460, multipliers 510, 520, 530, 540, 550 and 560, subtractors 610, 620, 630, 640, 650 and 660.

A first set of coefficients ($a_1$, $b_1$, $c_1$, $d_1$, $e_1$, $f_1$) for adjusting the colors of the skin tone spectrum are respectively supplied to the adders 410, 420, 430, 440, 450 and 460. A second set of coefficients ($a_2$, $b_2$, $c_2$, $d_2$, $e_2$, $f_2$) for adjusting colors not belonging to the skin tone spectrum are respectively supplied to the subtractors 610, 620, 630, 640, 650 and 660. Each subtractor subtracts the first coefficient from the second coefficient, for example, the subtractor 610 subtracts $a_1$ from $a_2$. The subtractors 610, 620, 630, 640, 650 and 660 supply subtracted coefficients to the multipliers 510, 520, 530, 540, 550 and 560, respectively.

The controller 25 provides to the low pass filter 500 a skin tone gate signal indicating whether the selected color spectrum is the skin tone spectrum. The skin tone gate signal has a low level "L" indicating that the selected color spectrum is the skin tone spectrum and a high level "H" indicating that the selected color spectrum is not the skin tone spectrum. It is appreciated that the skin tone signal may be used to indicate two color spectrums where neither represents the skin tone spectrum. The low pass filter 500 smooths the level transition of the skin tone gate signal, i.e., low to high (skin tone to background image). In other words, the low pass filter 500 provides a continuous skin tone gate signal to the multipliers 510, 520, 530, 540, 550 and 560.

Each multiplier multiplies the continuous skin tone gate signal with the modified second coefficient, for example, the multiplier 510 multiplies the continuous skin tone signal and the modified coefficient $a_2$ (i.e., $a_2-a_1$). The multipliers 510, 520, 530, 540, 550 and 560 provides the result of the multiplication to the adders 410, 420, 430, 440, 450 and 460, respectively.

The adders 410, 420, 430, 440, 450 and 460 respectively add the multiplication results to coefficients $a_1$, $b_1$, $c_1$, $d_1$, $e_1$, $f_1$, for example, the adder 410 adds $a_1$ and (skin tone gate signal times modified $a_2$) and supplies the result of the addition to the ALU 400. In other words, the adders 410, 420, 430, 440, 450 and 460 provide the first set of coefficients to the ALU if the skin tone gate signal is low and the second set of the coefficients to the ALU 400 if the skin tone gate signal is high. The ALU 400 calculates the three color corrected primary image signals $DR_{uc}$, $DG_U$, and $DB_C$ from the up-converted primary image sensing signals $DR_U$, $DG_U$ and $DB_U$ as follows:

$$DR_{UC} = DR_U + (DR_U - DG_U)a + (DR_U - DB_U)b \quad (15)$$

$$DG_{UC} = DG_U + (DG_U - DR_U)c + (DG_U - DB_U)d \quad (15)$$

$$DB_{UC} = DB_U + (DB_U - DR_U)e + (DB_U - DG_U)f \quad (15)$$

The color corrected primary image signals $DR_{UC}$, $DG_{UC}$ and $DB_{UC}$ are respectively supplied to the knee correction circuits 90R, 90G and 90B (FIG. 1).

Returning to FIG. 1, the three color corrected primary image signals $DR_{UC}$, $DG_{UC}$ and $DB_{UC}$ received from the linear matrix circuit 85 are supplied to the knee correction circuits 90R, 90G and 90B. The knee correction circuits 90R, 90G and 90B correct the tone characteristic and provide an optimum contrast for the image represented by the three color corrected primary image signals $DR_{UC}$, $DG_{UC}$ and $DB_{UC}$ and supply them to adders 91R, 91G, and 91B.

The adders 91R, 91G and 91B add the detail signal $D_b$ received from the image enhancer 20 to the color corrected primary image signals $DR_{UC}$, $DG_{UC}$ and $DB_{UC}$, respectively. Preferably, the detail signal $D_b$ is received by the adders 91R, 91G and 91B in advance of the color corrected primary image signals $DR_{UC}$, $DG_{UC}$ and $DB_{UC}$. The adders 91R, 91G and 91B respectively supply resulting primary signals to γ correction circuits 92R, 92G and 92B which convert the signal level in a non-linear fashion to correct the tone characteristic of these primary signals. The γ correction circuits 92R, 92G and 92B supply these three γ corrected primary signals to adders 93R, 93G and 93B.

The adders 93R, 93G and 93B add the detail signal $D_a$ received from the image enhancer 20 to the three γ corrected primary signals to control their signal level. Preferably, the detail signal $D_a$ is received by the adders 93R, 93G and 93B in advance of the three γ corrected primary signals. The adders 93R, 93G and 93B supply the resulting primary signals to clipping circuits 94R, 94G and 94B. The clipping circuits 94R, 94G and 94B respectively clip the resulting primary signals and provide these clipped primary signals to the Y/C matrix circuit.

The Y/C matrix circuit 95 generates a luminance signal Y and color difference signals Cr and Cb from the clipped primary signals and supplies the generated signals to clipping circuits 96Y, 96RY and 96BY. The clipping circuits 96Y, 96RY and 96BY clip the generated luminance signal Y and color difference signals Cr and Cb before they are outputted. The Y/C matrix circuit 95 also generates a luminance signal $Y_{VF}$ to be outputted to a view finder (not shown) via a clipping circuit 96YV.

The controller 25 generates an iris control signal IRC in response to the color spectrum detect signal CT and the three primary image sensing signals DR, DG and DB. The iris control signal is supplied to an iris driver 100. Alternatively, the controller 25 generates a shutter control signal SHC in response to the color spectrum detect signal CT and the three primary image sensing signals DR, DG and DB. The shutter control signal SHC is supplied to a sensor driver 16.

The iris driver 100 generates an iris drive signal IRD in response to the iris control signal IRC to drive an iris 11. The iris 11 controls amount of light transmitted to the CCD image sensors 13R, 13G and 13B to determine whether the input signal is within a selected color spectrum, i.e., flesh tone spectrum. The image sensor driver 16 generates an image sensor drive signal RV in response to the shutter control signal SHC to control the charge storage time of the CCD image sensors 13R, 13G, and 13B, thereby controlling the signal level of an image sensing signal. Alternatively, the image sensor drive signal RV varies the speed of an electronic shutter (not shown) to control the signal level of the image sensing signal. Consequently, even if the brightness of an object is changed by lighting or aperture of the image sensing apparatus, the present invention can advantageously provide a stable color detect signal CT to correctly detect the desired color spectrum and perform desired color correction without being affected by (sensitive to) luminance. It will be appreciated a liquid crystal or an ND (neutral density) filter comprised of two polarized filters may be used instead of the iris 11 and the electronic shutter to control the amount of light attenuation.

While the present invention has been particularly shown and described with reference to a preferred embodiment, it will be readily appreciated that various changes may be made without departing from the spirit and scope of the invention. For example, instead of using luminance signal W to detect the color spectrum, a non-linearly processed (γ corrected) luminance signal Y or like can be used if the detection accuracy is at an allowable level. Also, the controller 25 may select the image sensing signal of a particular color spectrum in response to the detect signal CT to automatically control the iris 11 or the speed of the electronic shutter. This enables the controller to control the brightness of the image even when the background brightness fluctuates.

What is claimed:

1. Apparatus for determining whether a color spectrum of an input signal is within a selected color spectrum, said input signal being obtained from a received image having an image luminance, said apparatus comprising:

means for processing said input signal to produce a luminance signal W;

means for selecting a color spectrum in accordance with first color information and second color information, wherein said first and second color information are determined as an inverse function of said luminance signal W and are unaffected by changes in said image luminance; and means for detecting whether the color spectrum of said input signal is within the selected color spectrum to generate a first detect signal.

2. The apparatus of claim 1, wherein said input signal comprises at least a red signal R and a blue signal B; wherein said first color information is determined as a function of said red signal R, and said second color information is determined as a function of said blue signal B.

3. The apparatus of claim 2, wherein said means for selecting selects a first reference color of said first color information, a second reference color of said second color information, a first detection threshold indicating a spectrum range of said first color information, and a second detection threshold indicating a spectrum range of said second color information; and wherein said means for detecting detects whether said input signal is within said color spectrum as a function of said first reference color, said second reference color, said first detection threshold and said second detection threshold.

4. The apparatus of claim 3, wherein said means for detecting generates, in a time division manner, a second detect signal indicating whether said input signal is within said first detection threshold and a third detect signal indicating whether said input signal is within said second detection threshold; and wherein said means for detecting includes means for multiplexing said second detect signal and said third detect signal to generate said first detect signal.

5. Apparatus for determining whether a color spectrum of a color sensing signal is within a selected color spectrum, said color sensing signal being obtained from a sensed image having an image luminance, said apparatus comprising:

- means for generating said color sensing signal from said sensed image;
- means for processing said color sensing signal to produce a luminance signal W;
- means for selecting a color spectrum in accordance with said first color information and second color information, wherein said first and second color information are determined as an inverse function of said luminance signal W and are unaffected by changes in said image luminance;
- means for detecting whether the color spectrum of said color sensing signal is within the selected color spectrum to generate a detect signal; and
- means for generating a detail signal for color correcting said sensed image as a function of said detect signal, wherein a signal level of said detail signal varies as a function of said detect signal.

6. The apparatus of claim 5, further comprising means for performing a non-linear level conversion on said color sensing signal to generate an image signal; and wherein said color sensing signal comprises at least a blue signal B and a red signal R; wherein said first color information is determined as a function of said red signal R and said second color information is determined as a function of said blue signal B; and wherein said image signal includes at least a luminance signal Y and color difference signal Cr.

7. Apparatus for determining whether a color spectrum of a color sensing signal is within a selected color spectrum, said color sensing signal being obtained from a sensed image having an image luminance, said apparatus comprising:

- means for generating a color sensing signal from said sensed image;
- means for processing said color sensing signal to produce a luminance signal W;
- means for selecting a color spectrum in accordance with first color information and second color information, wherein said first and second color information are determined as an inverse function of said luminance signal W and are unaffected by changes in said image luminance;
- means for detecting whether said color sensing signal is within the selected color spectrum to generate a detect signal;
- means for selecting a coefficient as a function of said detect signal; and
- means for correcting color of said color sensing signal in accordance with said selected coefficient.

8. The apparatus of claim 7, further comprising means for controlling a signal level of said color sensing signal in accordance with said detect signal.

9. The apparatus of claim 8, wherein said means for controlling includes an iris for controlling an amount of incident light to be projected onto said means for generating in accordance with said detect signal.

10. The apparatus of claim 8, wherein said means for controlling includes an electronic shutter for varying a charge storage time of said means for generating in accordance with said detect signal.

* * * * *